US011073644B2

(12) United States Patent
Ikeda et al.

(10) Patent No.: US 11,073,644 B2
(45) Date of Patent: Jul. 27, 2021

(54) TRANSPARENT SUBSTRATE WITH LIGHT-SHIELDING LAYER, AND VEHICLE INTERIOR MEMBER AND DISPLAY DEVICE USING THE SAME

(71) Applicant: AGC Inc., Chiyoda-ku (JP)

(72) Inventors: Toru Ikeda, Tokyo (JP); Tomoyuki Kobayashi, Tokyo (JP); Yosuke Takeda, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 168 days.

(21) Appl. No.: 16/393,342

(22) Filed: Apr. 24, 2019

(65) Prior Publication Data

US 2019/0324177 A1  Oct. 24, 2019

(30) Foreign Application Priority Data

Apr. 24, 2018  (JP) .............................. JP2018-083096

(51) Int. Cl.
*G02B 5/20* (2006.01)
*G02F 1/1335* (2006.01)

(52) U.S. Cl.
CPC ....... *G02B 5/208* (2013.01); *G02F 1/133502* (2013.01); *G02F 1/133512* (2013.01)

(58) Field of Classification Search
CPC .......... G02B 5/205; G02B 5/281; G02B 5/20; G02F 2201/38; G02F 2201/50; G02F 2201/13331; G02F 2203/11; G02F 1/133308; G02F 1/33512; G02F 1/1333; G02F 1/133205
USPC ........................................................ 359/359
See application file for complete search history.

(56) References Cited

U.S. PATENT DOCUMENTS

2019/0258107 A1* 8/2019 Fujii ................. G02F 1/133512

FOREIGN PATENT DOCUMENTS

| JP | 5392641 B1 | | 1/2014 |
| JP | 2014099159 A | * | 5/2014 |
| JP | 2017-49469 | | 3/2017 |
| JP | 6179215 B2 | | 8/2017 |

OTHER PUBLICATIONS

ProQuest translation of JP2014099159 obtained Dec. 4, 20 (Year: 2014).*

* cited by examiner

*Primary Examiner* — Kristina M Deherrera
(74) *Attorney, Agent, or Firm* — Oblon, McClelland, Maier & Neustadt, L.L.P.

(57) ABSTRACT

A transparent substrate with a light-shielding layer, including: a transparent substrate including a first main surface and a second main surface; an infrared ray-transmitting layer that is disposed so as to be in contact with the first main surface of the transparent substrate, transmits an infrared ray, and shields a visible light; and a light-shielding layer that is disposed on the infrared ray-transmitting layer, includes an opening that exposes a part of the infrared ray-transmitting layer, and shields the visible light and the infrared ray, in which the light-shielding layer includes an end portion that projects from an end portion of the infrared ray-transmitting layer, that is closest to an outer circumference of the transparent substrate, and is in contact with an end face of the infrared ray-transmitting layer and the transparent substrate.

11 Claims, 9 Drawing Sheets

TRANSPARENT SUBSTRATE WITH LIGHT-SHIELDING LAYER, AND VEHICLE INTERIOR MEMBER AND DISPLAY DEVICE USING THE SAME

TECHNICAL FIELD

The present invention relates to a transparent substrate with a light-shielding layer, and vehicle interior member and display device using the same.

BACKGROUND ART

Vehicle information devices such as car navigation systems and audio devices and portable communication devices include a display device.

Display devices include a protective cover which is a sheet-like transparent substrate, in front of a display panel via an adhesive layer (Patent document 1). The protective cover has functions of reducing a reflection of external light and protecting the display panel from external impact. On the display panel side surface of the protective cover, for example, a frame-shaped light-shielding layer is provided. The light-shielding layer has functions of, in addition to improving the appearance, hiding interconnections formed on the display panel side and shielding illumination light of a backlight to prevent leakage of illumination light from a peripheral portion of the display panel.

There is a case that the light-shielding layer has a partial opening for transmission of infrared ray. For example, there may be a case where a light-shielding layer is partially opened to form an opening, and an infrared ray-transmitting layer that is higher in infrared ray transmittance than the light-shielding layer and approximately the same in visible light transmittance as the light-shielding layer is formed in the opening so as to serve as a window for infrared ray communication.

Vehicle information devices and portable communication devices may perform a communication or detect an object using electromagnetic waves outside the wavelength range of visible light, such as infrared ray. In a case of performing a communication or detecting an object using infrared ray, an infrared ray sensor and an infrared ray-transmitting layer formed in a display region obstruct display and lower the appearance. Accordingly, by forming a partial opening through the light-shielding layer and forming an infrared ray-transmitting layer therein, an infrared ray sensor can be disposed behind the light-shielding layer and the infrared ray-transmitting layer may be made unnoticeable.

However, even if a partial opening is formed through the light-shielding layer and an infrared ray-transmitting layer is formed therein, there may occur a case that the infrared ray-transmitting layer becomes noticeable. This is because the infrared ray-transmitting layer is different from the light-shielding layer in visible light transmittance. For another reason, where a light-shielding layer and an infrared ray-transmitting layer are formed by applying inks and baking them, it is required to satisfy physical properties relating to hardness, adhesion to the display panel, etc. and hence it is not proper to consider only the color.

In view of the above, a structure has been proposed in which an infrared ray-transmitting layer and a light-shielding layer are formed on a transparent substrate in this order and a partial opening is formed through the light-shielding layer, whereby the infrared ray-transmitting layer is made unnoticeable (Patent documents 2 and 3). In this structure, only the infrared ray-transmitting layer is apparently seen even in a region where the light-shielding layer is formed. Thus, the color difference between the region where only the infrared ray-transmitting layer is formed and the region where the light-shielding layer is formed is not conspicuous.

Patent document 1: Japanese Patent No. 6,179,215
Patent document 2: JP-A-2017-49469
Patent document 3: Japanese Patent No. 5,392,641

SUMMARY OF INVENTION

The structures disclosed in Patent documents 2 and 3 are useful to make the color difference between the infrared ray-transmitting layer and the light-shielding layer unnoticeable.

On the other hand, the infrared ray-transmitting layer is required to have, among other things, a special optical property of transmitting only infrared ray selectively. As a result, if priority is given to its optical properties, it is more difficult for the infrared ray-transmitting layer to sufficiently satisfy hardness, weathering resistance, and physical properties such as adhesion to the transparent substrate than for the light-shielding layer, possibly resulting in insufficient strength of the adhesion of the infrared ray-transmitting layer to the transparent substrate. In particular, the infrared ray-transmitting layer is more prone to be affected by stress that occurs due to the difference in expansion coefficient from the transparent substrate when the temperature or humidity has varied, external impact, and quality change due to exposure to cleaning liquid or the like, as the position comes closer to the outer circumference of the transparent substrate. As a result, the infrared ray-transmitting layer may peel off from a portion close to the outer circumference of the transparent substrate.

The present invention has been made in view of the above problems, and an object of the present invention is therefore to provide a transparent substrate with a light-shielding layer in which necessary peel strength can be secured even if it has a structure where an infrared ray-transmitting layer is formed so as to be in contact with the transparent substrate.

The present invention provides a transparent substrate with a light-shielding layer, including: a transparent substrate including a first main surface and a second main surface; an infrared ray-transmitting layer that is disposed so as to be in contact with the first main surface of the transparent substrate, transmits an infrared ray, and shields a visible light; and a light-shielding layer that is disposed on the infrared ray-transmitting layer, includes an opening that exposes a part of the infrared ray-transmitting layer, and shields the visible light and the infrared ray, in which the light-shielding layer includes an end portion that projects from an end portion of the infrared ray-transmitting layer, that is closest to an outer circumference of the transparent substrate, and is in contact with an end face of the infrared ray-transmitting layer and the transparent substrate.

In the present invention, since the end portion of the light-shielding layer projects from the end portion, closest to the outer circumference of the transparent substrate, of the infrared ray-transmitting layer, so as to be in contact with the end face of the infrared ray-transmitting layer and the transparent substrate, the end portion, closest to the outer circumference of the transparent substrate, of the infrared ray-transmitting layer is covered with the light-shielding layer.

Thus, even if the covered portion of the infrared ray-transmitting layer receives stress that is caused by an expansion coefficient difference when the temperature or humidity has varied or receives external force of external impact, the light-shielding layer absorbs stress or external force, whereby necessary peel strength of the infrared ray-transmitting layer can be secured. Furthermore, since cleaning liquid is hard to permeate to the infrared ray-transmitting layer, the infrared ray-transmitting layer is not likely to peel off due to its deterioration caused by the cleaning liquid.

In the present invention, it is preferable that the light-shielding layer and the infrared ray-transmitting layer each are shaped in a frame as a plane shape, and an outer circumferential end portion of the frame of the light-shielding layer is in contact with the transparent substrate.

In this mode of the present invention, the light-shielding layer is shaped like a frame and the outer circumferential end portions of the infrared ray-transmitting layer are covered with the light-shielding layer, and thereby being protected. Thus, the infrared ray-transmitting layer can be prevented from peeling off starting from its outer circumferential portion. As a result, necessary peel strength of the infrared ray-transmitting layer can be secured even though the infrared ray-transmitting layer is in contact with the transparent substrate.

In the present invention, it is preferable that the end portion of the light-shielding layer, that is in contact with the transparent substrate, is closer to the outer circumference of the transparent substrate by more than or equal to 0.01 mm than the end portion of the infrared ray-transmitting layer is.

In this mode of the present invention, since the light-shielding layer is closer to the outer circumference of the transparent substrate by more than or equal to 0.01 mm than the end portion of the infrared ray-transmitting layer is, the projected portion of the light-shielding layer is long enough to prevent peeling of the infrared ray-transmitting layer.

In the present invention, it is preferable that the end portion of the light-shielding layer, that is in contact with the transparent substrate, is closer to the outer circumference of the transparent substrate by less than or equal to 0.5 mm than the end portion of the infrared ray-transmitting layer is.

In this mode of the present invention, since the light-shielding layer is closer to the outer circumference of the transparent substrate by less than or equal to 0.5 mm than the end portion of the infrared ray-transmitting layer is, a phenomenon can be prevented that a color difference between the projected portion of the light-shielding layer and the infrared ray-transmitting layer becomes conspicuous.

In the present invention, it is preferable that the transparent substrate has a thickness of 0.5 mm to 5 mm.

In this mode of the present invention, where the thickness of the transparent substrate is in this range, a transparent substrate with a light-shielding layer can be obtained that is high in strength and has good texture while having a reduced weight.

In the present invention, it is preferable that the transparent substrate includes an end face including a chamfered portion, and the light-shielding layer is in contact with the chamfered portion.

In this mode of the present invention, since the projected portion of the light-shielding layer which is located outside the infrared ray-transmitting layer also covers the chamfered portion, the excoriation resistance of the chamfered portion is also increased.

Furthermore, where the chamfered portion is higher in surface roughness than the first main surface, the projected portion of the light-shielding layer bites into the rough surface of the chamfered portion. As a result, the adhesion between the light-shielding layer and the transparent substrate, that is, their adhesion strength, is increased.

In the present invention, it is preferable that the transparent substrate with a light-shielding layer has a visible light transmittance as measured according to JIS R 3106: 1998 of smaller than or equal to 0.1% in a light-shielding region, and has a visible light transmittance as measured according to JIS R 3106: 1998 of smaller than or equal to 5% and an infrared ray transmittance in a wavelength range of 900 nm to 1,000 nm of higher than or equal to 70% in an infrared ray-transmitting region, in which, the light-shielding region is a region where the transparent substrate, the infrared ray-transmitting layer, and the light-shielding layer overlap with one another in a top view of the transparent substrate with a light-shielding layer, and the infrared ray-transmitting region is a region where the transparent substrate and the infrared ray-transmitting layer overlap with each other in the top view of the transparent substrate with a light-shielding layer.

In this mode of the present invention, since the visible light transmittance of the light-shielding region of the transparent substrate with a light-shielding layer as measured according to JIS R 3106: 1998 is smaller than or equal to 0.1%, visible light can be shielded reliably. Since the visible light transmittance of the infrared ray-transmitting region as measured according to JIS R 3106: 1998 is smaller than or equal to 5% and the transmittance of infrared ray in the wavelength range of 900 nm to 1,000 nm of the infrared ray-transmitting region is higher than or equal to 70%, infrared ray can be transmitted selectively.

In the present invention, it is preferable that the transparent substrate includes a bent portion.

In this mode of the present invention, since the transparent substrate includes the bent portion, the attachment accuracy does not lower even if a counterpart member to which the transparent substrate with a light-shielding layer is to be attached has a bent shape.

In the present invention, it is preferable that the transparent substrate includes a functional layer on the second main surface, and the functional layer is at least one layer selected from the group consisting of an antireflection layer, an antiglare layer and an antifouling layer.

In this mode of the present invention, where the antiglare layer is provided as the functional layer, light that is incident from the side of the second main surface can be scattered, whereby the degree of reflection of an undesired image carried by the incident light can be lowered.

In this mode of the present invention, where the antireflection layer is provided as the functional layer, reflection of light that is incident from the side of the second main surface can be prevented, whereby reflection of an undesired image carried by the incident light can be prevented.

Where the antifouling layer is provided as the functional layer, the degree of sticking of a stain such as a fingerprint, sebum, or sweat on the second main surface can be lowered even if a human finger touches it.

In the present invention, it is preferable that the transparent substrate is a chemically strengthened glass.

In this mode of the present invention, since the transparent substrate is made of chemically strengthened glass, a transparent substrate with a light-shielding layer can be provided that is high in strength and excoriation resistance and has good texture.

Another aspect of the present invention provides a vehicle interior member including any of the above described transparent substrate with a light-shielding layer.

In this mode of the present invention, a vehicle interior member that includes a transparent substrate with a light-shielding layer can be obtained.

A further aspect of the present invention provides a display device including any of the above described transparent substrate with a light-shielding layer.

In this mode of the present invention, a display device that is protected by a transparent substrate with a light-shielding layer can be obtained.

DESCRIPTION OF EMBODIMENTS

An embodiment of the present invention will be hereinafter described with reference to the drawings.

Configuration of Transparent Substrate with a Light-Shielding Layer:

First, the structure of a transparent substrate with a light-shielding layer will be described with reference to FIG. 1, FIGS. 2A and 2B, and FIG. 3.

As shown in FIG. 1, FIGS. 2A and 2B, and FIG. 3, the transparent substrate with light-shielding layer 1 includes a transparent substrate 2, an infrared ray-transmitting layer 3, and a light-shielding layer 5.

Figure 3:
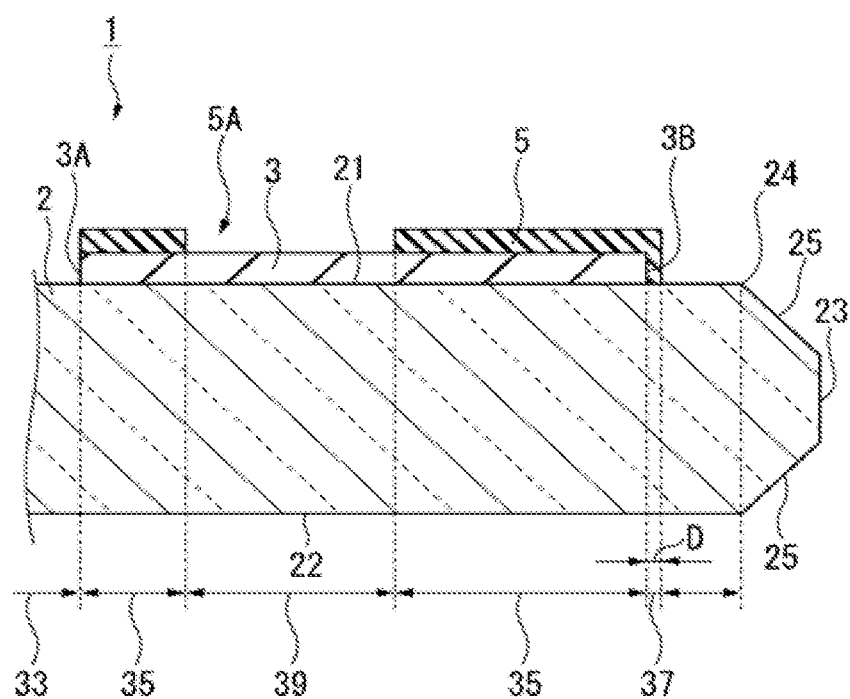
FIG. 3 is a sectional view of an end portion taken along line A-A in FIG. 2A.

The transparent substrate 2 is a transparent member that is rectangular in a planar view and is made of a material that transmits visible light. The term "transparent member" as used here means a member whose visible light transmittance measured according to JIS R 3106: 1998 is higher than or equal to 85%. This definition also applies to the following description. As shown in FIG. 3, the transparent substrate 2 has a first main surface 21, a second main surface 22, and end faces 23. Each end face 23 is formed with chamfered portions 25. It is preferable that the transparent substrate 2 be made of a material that is high in strength and excoriation resistance and is good in texture. An example of such a material includes glass, in particular, chemically strengthened glass.

The infrared ray-transmitting layer 3 is formed so as to be in contact with the transparent substrate 2 to impart a light-shielding property for visible light and a permeability for infrared ray to the transparent substrate with light-shielding layer 1. Since the infrared ray-transmitting layer 3 transmits infrared ray while shielding visible light, the infrared ray transmittance of the infrared ray-transmitting layer 3 is at least on the same level as that of the transparent substrate 2 and the visible light transmittance of the infrared ray-transmitting layer 3 is lower than that of the transparent substrate 2.

In the present embodiment, the infrared ray-transmitting layer 3 is shaped like a rectangular frame in a planar view of the transparent substrate with light-shielding layer 1 and formed on a peripheral portion of the first main surface 21 of the transparent substrate 2.

It is preferable that the thickness of the infrared ray-transmitting layer 3 be in a range of 1 µm to 10 µm, and even preferable that the thickness be in a range of 2 µm to 5 µm. When the thickness of the infrared ray-transmitting layer 3 is larger than or equal to the lower limit value, transmittance unevenness is not prone to occur. When the thickness of the infrared ray-transmitting layer 3 is smaller than or equal to the upper limit value, occurrence of stress-induced peeling at the interface between the infrared ray-transmitting layer 3 and the transparent substrate 2, and the interface between the infrared ray-transmitting layer 3 and the light-shielding layer 5 can be suppressed. Also, when the infrared ray-transmitting layer 3 is bonded to a liquid crystal panel, an "air line" is not prone to be formed by residual air at step portions.

It is preferable that the refractive index of the infrared ray-transmitting layer 3 be close to that of the transparent substrate 2. For example, where the transparent substrate 2 is made of glass, it is preferable that the difference |n1−n2| between the refractive index n1 of the glass and the refractive index n2 of the infrared ray-transmitting layer 3 be smaller than or equal to 0.3 and even preferable that the difference |n1−n2| be smaller than or equal to 0.2. When the difference |n1−n2| is within this range, the reflectance becomes sufficiently small in the overlap region of the infrared ray-transmitting layer 3 and the light-shielding layer 5. The term "refractive index" means the real part of a refractive index at a wavelength of 550 nm.

The light-shielding layer 5 is formed on the infrared ray-transmitting layer 3 to impart a light-shielding property to the transparent substrate with light-shielding layer 1. As shown in FIG. 1, FIGS. 2A and 2B, and FIG. 3, the light-shielding layer 5 is shaped like a frame like the infrared ray-transmitting layer 3 is.

End portions of the light-shielding layer 5 project from end portions, closest to the outer circumference of the transparent substrate 2, of the infrared ray-transmitting layer 3, so as to be in contact with respective end faces of the infrared ray-transmitting layer 3 and the transparent substrate 2. Since the infrared ray-transmitting layer 3 is shaped like a frame as shown in FIG. 1, FIGS. 2A and 2B, and FIG. 3, the infrared ray-transmitting layer 3 has two kinds of end portions, that is, inner circumferential end portions 3A and outer circumferential end portions 3B (see FIG. 3). Since the outer circumferential end portions 3B are closer to the outer circumference of the transparent substrate 2, the end portions of the light-shielding layer 5 project from the respective outer circumferential end portions 3B of the infrared ray-transmitting layer 3, so as to be in contact with the respective end faces of the infrared ray-transmitting layer 3 and the transparent substrate 2. The light-shielding layer 5 may either project or not project from the respective inner circumferential end portions 3A of the infrared ray-transmitting layer 3.

In the following description, an overlap region of the transparent substrate 2, the infrared ray-transmitting layer 3, and the light-shielding layer 5 in a planar view of the transparent substrate with light-shielding layer 1 will be referred to as a "light-shielding region 35." In a planar view of the transparent substrate with light-shielding layer 1, a region where the portions of the light-shielding layer 5 project from the infrared ray-transmitting layer 3 will be referred to as a "projection region 37." Overlap regions of only the transparent substrate 2 and the infrared ray-transmitting layer 3 in a planar view of the transparent substrate with light-shielding layer 1 will be referred to as "infrared ray-transmitting regions 39." A region that is surrounded by the infrared ray-transmitting layer 3 and the light-shielding layer 5 and in which the first main surface 21 of the transparent substrate 2 is exposed will be referred to as a "display region 33."

The light-shielding layer 5 has openings 5A which are opened partially in a planar view from the first main surface 21 side so as to expose corresponding portions of the infrared ray-transmitting layer 3. In the transparent substrate with light-shielding layer 1, inside regions of the openings 5A are the above-mentioned infrared ray-transmitting regions 39, respectively.

The light-shielding layer 5 is lower than the transparent substrate 2 in both of visible light transmittance and infrared ray transmittance.

It is preferable that the thickness of the light-shielding layer 5 be in a range of 1 to 20 µm, even preferable that it be in a range of 1 µm to 10 µm, and further preferable that it be in a range of 2 µm to 5 µm. When the thickness of the light-shielding layer 5 is larger than or equal to the lower limit value, transmittance unevenness is not prone to occur. When the thickness of the light-shielding layer 5 is smaller than or equal to the upper limit value, stress-induced peeling is not prone to occur at the interface between the infrared ray-transmitting layer 3 and the light-shielding layer 5. Also, when the light-shielding layer 5 is bonded to a liquid crystal panel, an "air line" due to residual air at step portions is not prone to be formed.

As described above, in the transparent substrate with light-shielding layer 1, the infrared ray-transmitting layer 3 and the light-shielding layer 5 are laid on the transparent substrate 2 in prescribed order so as to form prescribed shapes, whereby the light-shielding region 35, the infrared ray-transmitting regions 39, the projection region 37, and the display region 33 are formed.

The light-shielding region 35 is a region for hiding members provided on the side of the first main surface 21 and shielding light coming from the side of the first main surface 21. For example, where the transparent substrate with light-shielding layer 1 is a protective cover of a display panel, the light-shielding region 35 serves to hide interconnections and shield illumination light of a backlight to prevent leakage of illumination light from the periphery of the display panel. An optical property capable of shielding visible light and infrared ray needs to be provided in the light-shielding region 35. More specifically, it is preferable that the optical density (OD value) as measured from the side of the second main surface 22 be larger than or equal to 4, even preferable that it be larger than or equal to 4.2, and further preferable that it be larger than or equal to 4.5.

The term "optical density (OD value)" as used here means, as in the following Equation (A), the absolute value of the common logarithm (base: 10) of the ratio of a transmission light quantity Ta that has passed through a target object to an incident light quantity I of certain light:

$$(\text{OD value}) = |\log_{10}(Ta/I)| \tag{A}$$

The optical density thus indicates hiding performance. This definition also applies to the following description.

According to Equation (A), when the incident light quantity I of visible light (wavelength: 360 nm to 830 nm) is equal to 1,000 and the transmission light quantity Ta is equal to 1, the OD value is calculated as $|\log_{10}(1/1000)|=3$.

It is preferable that the visible light transmittance of the light-shielding region 35 as measured according to JIS R 3106: 1998 be smaller than or equal to 0.1%, and even preferable that it be smaller than or equal to 0.01%. This is because setting the visible light transmittance sufficiently low renders the back side hard to see in the region other than the display region.

It is preferable that the light-shielding region 35 has the ratio of an average reflectance (average value of reflectance) of light in a wavelength range of 600 nm to 700 nm to that of light in a wavelength range of 400 nm to 600 nm be larger than or equal to 1.5.

When the ratio of the average reflectance is larger than or equal to the lower limit value, the color difference between the light-shielding region 35 and the infrared ray-transmitting regions 39 becomes small. It is preferable that the ratio of the average reflectance be larger than or equal to 2, even preferable that the ratio of the average reflectance be in a range of 2 to 10, and further preferable that the ratio of the average reflectance be in a range of 2 to 3. When the ratio of the average reflectance is smaller than or equal to the upper limit value, a reddish color shift in the light-shielding region 35 can be suppressed and hence superior design performance is obtained. As described below, the term "reflectance" as used here means a reflectance RD that is obtained at the interface between the infrared ray-transmitting layer 3 and the transparent substrate 2.

The reflectance is determined in the following manner:

[1] A measurement value of reflectance of light entering the display region 33 from the side of the second main surface 22 of the transparent substrate 2 is represented by a reflectance RA. Light that is used for calculating the reflectance RA includes light reflected from the surface (second main surface 22) of the transparent substrate 2 and light that has passed through the transparent substrate 2, reflected at the interface between the transparent substrate 2 and the first main surface 21 side air, and exited the transparent substrate 2 from its second main surface 22. Where no antireflection film or the like is formed on the surface of the transparent substrate 2, the reflectance of the second main surface 22 of the transparent substrate 2 is equal to the reflectance at the interface between the transparent substrate 2 and the first main surface 21 side air. Each of these values is represented by a reflectance RB. The reflectances RA and RB satisfy the following Equation (1):

$$(\text{Reflectance } RA) = (\text{reflectance } RB) + (\text{reflectance } RB)\{1 - (\text{reflectance } RB)\}^2 \tag{1}$$

The reflectance RB is calculated according to Equation (1) using a measured reflectance RA value.

[2] A measurement value of reflectance of light entering the light-shielding region 35 from the side of the second main surface 22 is represented by a reflectance RC. The reflectance at the interface between the infrared ray-transmitting layer 3 and the transparent substrate 2 in the light-shielding region 35 is represented by a reflectance RD. Light that is used for calculating the reflectance RD includes light reflected from the interface between the transparent substrate 2 and the infrared ray-transmitting layer 3 and light reflected from the interface between the infrared ray-transmitting layer 3 and the light-shielding layer 5. The reflectances RB, RC, and RD satisfy the following Equation (2):

$$\text{(Reflectance } RC) = \text{(reflectance } RB) + \text{(reflectance } RD)\{1-\text{(reflectance } RB)\}^2 \quad (2)$$

The reflectance RD is calculated using the reflectance RB obtained according to Equation (1) and the reflectance RC that is obtained as a measurement value. The reflectance RD is called a reflectance in the light-shielding region 35.

Figure 1:
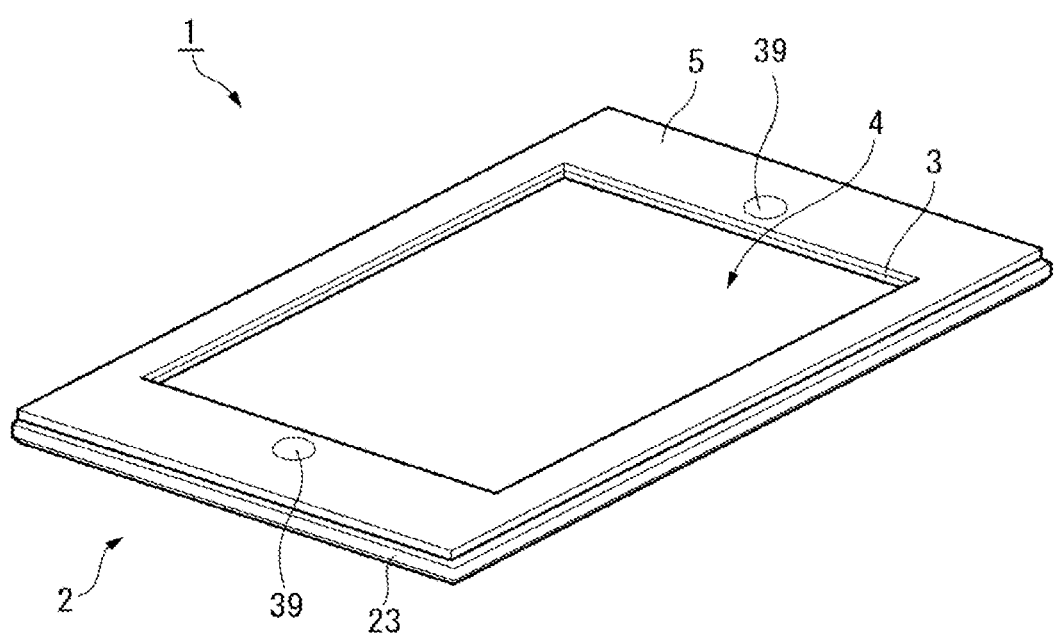
FIG. 1 is a perspective view of a transparent substrate with a light-shielding layer according to an embodiment of the present invention.
Figure 2A:
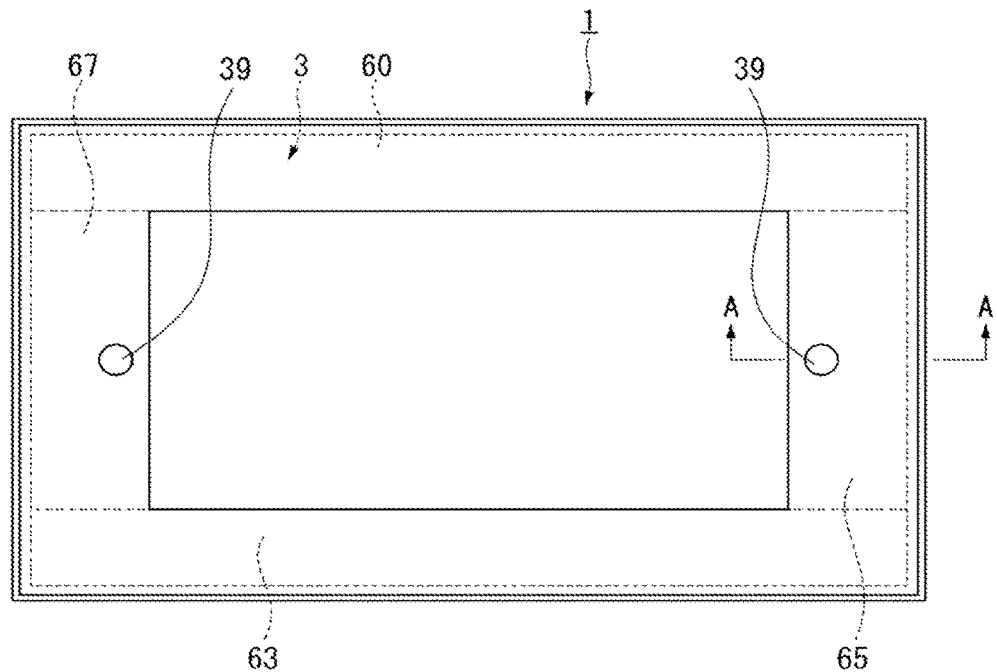
FIGS. 2A and 2B are a plan view and a back view, respectively, of the transparent substrate with a light-shielding layer according to the present embodiment.
Figure 2B:
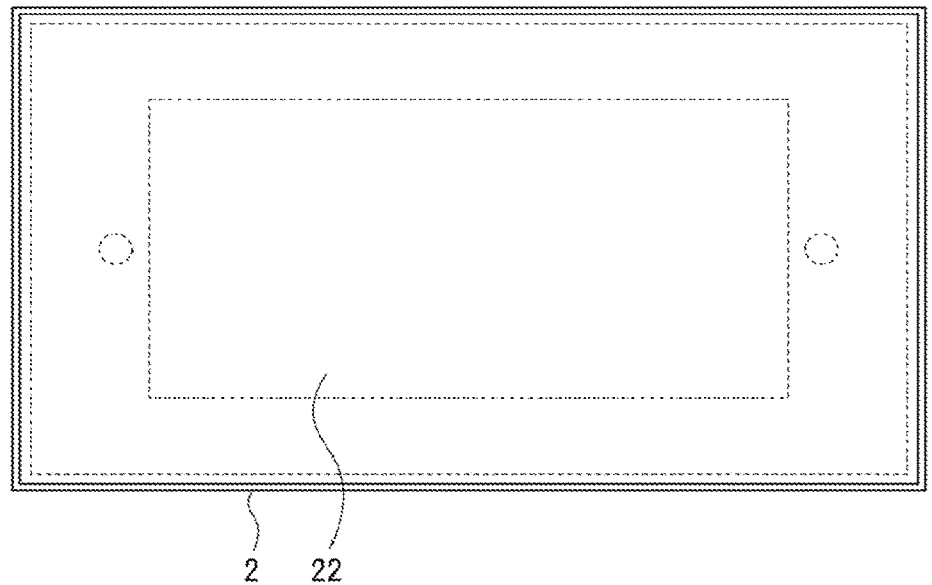

The infrared ray-transmitting regions 39 are regions that transmit infrared ray while shielding visible light. For example, where the transparent substrate with light-shielding layer 1 is a protective cover of a display panel, the infrared ray-transmitting regions 39 are regions to serve as windows for infrared ray communication, a human sensor, an infrared ray camera, a motion sensor, or motion capturing.

Where the transparent substrate with light-shielding layer 1 is a protective cover of a display panel having illumination light, as shown in FIG. 2B, a user cannot visually recognize the infrared ray-transmitting regions 39 irrespective of whether the display panel emits illumination light. Thus, where the display panel includes an infrared ray camera, by installing an infrared ray sensor on the back side (i.e., on the first main surface 21 side) in an infrared ray-transmitting region 39, the infrared ray-transmitting regions 39 can be used as windows for communication or object detection using infrared ray while hiding the infrared ray sensor from the user.

The infrared ray-transmitting regions 39 need to have such an optical property as to transmit infrared ray while shielding visible light. More specifically, it is preferable that in a planar view of the transparent substrate with light-shielding layer 1, the visible light transmittance measured from the side of the second main surface 22 according to JIS R 3016: 1998 be in a range of 0.1% to 50%, and even preferable that it be in a range of 0.8% to 25%.

It is preferable that the minimum value of the transmittance of light in a wavelength range of 800 nm to 1,000 nm as measured from the side of the second main surface 22 be higher than or equal to 70%, and even preferable that it be higher than or equal to 75%.

The minimum value of the transmittance of light in the wavelength range of 800 nm to 1,000 nm means a minimum infrared ray transmittance value. As for a specific method, a transmission spectrum is measured using a spectrophotometer and its minimum value is determined. A maximum infrared ray transmittance value can also be determined by a similar method. This also applies to the following description In the infrared ray-transmitting regions 39, it is preferable that the transmittance of infrared ray in a wavelength range of 900 nm to 1,000 nm be higher than or equal to 70%. This is to increase the sensitivity of an infrared ray sensor, infrared ray camera, a motion sensor, or motion capturing, and thereby suppressing power consumption by setting the transmittance high. In the infrared ray-transmitting regions 39, it is even preferable that the transmittance of infrared ray in the wavelength range of 900 nm to 1,000 nm be higher than or equal to 75%, further preferable that it be higher than or equal to 80%, and particularly preferable that it be higher than or equal to 85%.

In the infrared ray-transmitting regions 39, it is preferable that the visible light transmittance measured according to JIS R 3016: 1998 be lower than or equal to 5%, even preferable that it be lower than or equal to 2%, and is further preferable that it be lower than or equal to 1%. This is to improve the appearance of the light-shielding region 35 to thereby increase the design performance by making the boundaries between the light-shielding region 35 and the infrared ray-transmitting regions 39 less visible.

The display region 33 is a region for transmitting visible light. For example, where the transparent substrate with light-shielding layer 1 is a protective cover of a display panel, the display region 33 corresponds to a display portion of the display panel.

The projection region 37 is a region where the portions of the light-shielding layer 5 project from the infrared ray-transmitting layer 3.

It is preferable that the projection region 37 is projected to be closer to the outer circumference of the transparent substrate 2 by more than or equal to 0.01 mm than the end portions of the infrared ray-transmitting layer 3 are. More specifically, it is preferable that the width (thickness) D (see FIG. 3) of the projection region 37 in the direction parallel with the second main surface 22 be longer than or equal to 0.01 mm. Where the width D is longer than or equal to 0.01 mm, the projected portions of the light-shielding layer 5 that are located outside the infrared ray-transmitting layer 3 are long enough to prevent the infrared ray-transmitting layer 3 from peeling off. It is even preferable that the width D be longer than or equal to 0.05 mm, and further preferable that it be longer than or equal to 0.1 mm.

It is preferable that the width D be shorter than or equal to 0.5 mm. Where the width D is shorter than or equal to 0.5 mm, a phenomenon that the color difference between the projection region 37 and the infrared ray-transmitting layer 3 becomes conspicuous can be suppressed and hence the projection region 37 can be prevented from looking black along the outline of the infrared ray-transmitting layer 3. It is even preferable that the width D be shorter than or equal to 0.4 mm, and further preferable that it be shorter than or equal to 0.3 mm.

Manufacturing Method of Transparent Substrate with a Light-Shielding Layer:

Next, a manufacturing method of the transparent substrate with light-shielding layer 1 will be described with reference to FIGS. 2A and 2B, FIG. 3, and FIGS. 4A-4C.

Figure 4A:
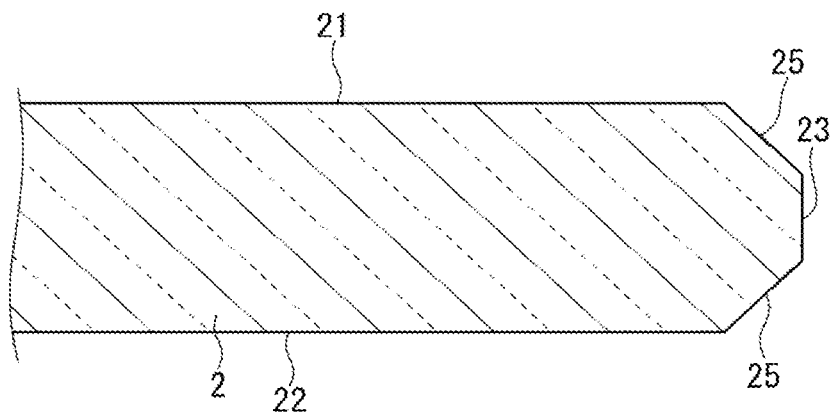
FIGS. 4A-4C are sectional views of an end portion for description of a manufacturing method of a transparent substrate with a light-shielding layer according to the present embodiment.

First, a transparent substrate, for example, a glass sheet, is cut into a prescribed size and then subjected to chamfering, whereby a transparent substrate 2 shown in FIG. 4A is prepared. It is preferable that the chamfering be performed so that the dimension of the chamfered portions 25 be in a range of 0.05 mm to 0.5 mm in a planar view. If necessary, chemical strengthening is performed after the chamfering.

Figure 4B:
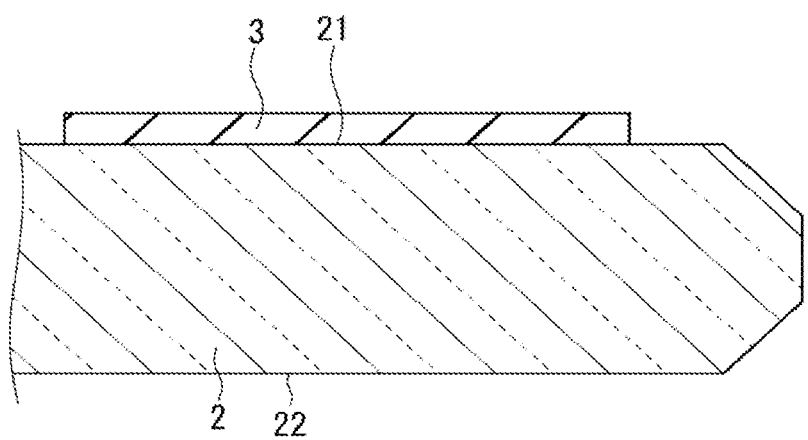

Then, as shown in FIG. 4B, an infrared ray-transmitting layer 3 is formed on the transparent substrate 2.

There are no particular limitations on the method for forming the infrared ray-transmitting layer 3; examples thereof include a bar coating method, a revere coating method, a gravure coating method, a die coating method, a roll coating method, a spray coating method, a screen method, and an inkjet method. From the stand point of the ease of thickness control, it is preferable to use the screen method or the inkjet method.

Where the screen method is used, the infrared ray-transmitting layer 3 can be formed in a desired region by controlling the forming regions and sizes of a mesh portion (for ink permeation) and an emulsion portion (for suppression of ink permeation) that constitute a screen printing sheet used.

It is preferable that the mesh diameter of the screen printing sheet be in a range of 15 µm to 35 µm. It is preferable that the squeegee speed be in a range of 50 mm/s to 200 mm/s, and even preferable that it be in a range of 100 mm/s to 200 mm/s. It is preferable that the film thickness of the infrared ray-transmitting layer 3 be in a range of 1 µm to 10 µm. An infrared ray-transmitting layer 3 with such quality as to cause no problems when viewed by a user can be formed by performing printing under the above conditions.

Where the inkjet method is used, a pattern is formed on the transparent substrate 2 by jetting out minute droplets of liquefied ink from nozzles in pulse form. The transparent substrate 2 is positioned with respect to the origin of a nozzle moving mechanism and the nozzles are moved approximately in a horizontal direction over the transparent substrate 2 while jetting out minute ink droplets according to instructions from a computer. As a result, ink dots are formed consecutively and an infrared ray-transmitting layer 3 is thereby formed in a prescribed pattern.

Where the transparent substrate 2 has a curved printing surface, in view of pattern distortion etc., it is preferable that the distance between the nozzles for jetting out ink droplets and the transparent substrate 2 be kept approximately constant. For example, it is preferable to use a mechanism for rotating and moving the nozzles or the transparent substrate 2 according to an intended pattern while keeping the distance between the nozzles and the transparent substrate 2 approximately constant. It is even preferable to use a mechanism for rotating and moving the transparent substrate 2 with respect to the nozzles fixed because with this mechanism the pressure for supplying ink to the nozzles is kept stable and the ink jetting rates of the nozzles can be kept stable.

In general, in the inkjet method, a pattern is formed while the nozzles are moved straightly in one direction. Thus, to form a frame-shaped infrared ray-transmitting layer 3, as shown in FIG. 2A, it is preferable to print four straight patterns successively that are a top infrared ray-transmitting layer 60, a bottom infrared ray-transmitting layer 63, a right infrared ray-transmitting layer 65, and a left infrared ray-transmitting layer 67.

More specifically, the transparent substrate 2 is mounted on a support stage (not shown) and the jetting holes of the nozzles are set over a bottom-right position (see FIG. 2A) of the first main surface 21 of the transparent substrate 2. The nozzles are then moved to above a bottom-left position while causing them to jet out ink from their jetting holes, whereby a bottom infrared ray-transmitting layer 63 (see FIG. 2A) is printed.

Then at least one of the support stage and the set of nozzles are moved relative to each other, whereby the jetting holes are set over a top-right position of the first main surface 21. The nozzles are then moved to above a top-left position while causing them to jet out ink from their jetting holes, whereby a top infrared ray-transmitting layer 60 (see FIG. 2A) is printed.

Then the jetting holes of the nozzles are set over a top-right position of the first main surface 21 of the transparent substrate 2 (see FIG. 2A). The nozzles are then moved to above a bottom-right position while causing them to jet out ink from their jetting holes, whereby a right infrared ray-transmitting layer 65 (see FIG. 2A) is printed.

Finally, at least one of the support stage and the set of nozzles are moved relative to each other, whereby the jetting holes are set over a top-left position of the first main surface 21. The nozzles are then moved to above a bottom-left position while causing them to jet out ink from their jetting holes, whereby a left infrared ray-transmitting layer 67 (see FIG. 2A) is printed.

The thickness of an infrared ray-transmitting layer 3 formed can be adjusted by controlling the rate of ink jetting from the jetting holes or the nozzle movement speed. A thicker infrared ray-transmitting layer 3 can be formed by increasing the jetting rate or lowering the movement speed. A thinner infrared ray-transmitting layer 3 can be formed by decreasing the jetting rate or increasing the movement speed.

In the present embodiment, since the top infrared ray-transmitting layer 60, the bottom infrared ray-transmitting layer 63, the right infrared ray-transmitting layer 65, and the left infrared ray-transmitting layer 67 are the same in thickness, it is preferable to set the same sets of printing conditions (ink jetting rate and nozzle movement speed) for formation of these layers. This is to prevent a variation of the infrared ray transmittance in the infrared ray-transmitting layer 3 to allow an infrared ray sensor or the like to operate stably, and to prevent a variation of the visible light transmittance in the infrared ray-transmitting layer 3 to make it less prone to be recognized visually as color unevenness.

However, it is preferable that the top infrared ray-transmitting layer 60 and each of the right infrared ray-transmitting layer 65 and the left infrared ray-transmitting layer 67 have an overlap connection portion. Likewise, it is preferable that the bottom infrared ray-transmitting layer 63 and each of the right infrared ray-transmitting layer 65 and the left infrared ray-transmitting layer 67 have an overlap connection region. This is to suppress a phenomenon that ink droplets applied in a connection region is sucked by existing ink to lower the film thickness or repelled by existing ink to cause an unprinted portions, thereby making such a portion(s) less prone to be recognized visually as color unevenness.

It is preferable that the thickness of the infrared ray-transmitting layer 3 in each connection region be in a range of 1.1 to 2.0 times its thickness in the regions other than the connection regions. This is to make color differences between the connection portions and the other portions less recognizable visually and to suppress occurrence of an air line due to a step when a liquid crystal panel or the like is bonded to the printed surface.

The infrared ray-transmitting layer 3 is thereafter hardened by drying and baking (in the case of a thermosetting ink) or UV illumination (in the case of a photocurable ink). The top infrared ray-transmitting layer 60, the bottom infrared ray-transmitting layer 63, the right infrared ray-transmitting layer 65, and the left infrared ray-transmitting layer 67 may be dried and baked every time each of them is formed or after formation of all of them.

Figure 4C:
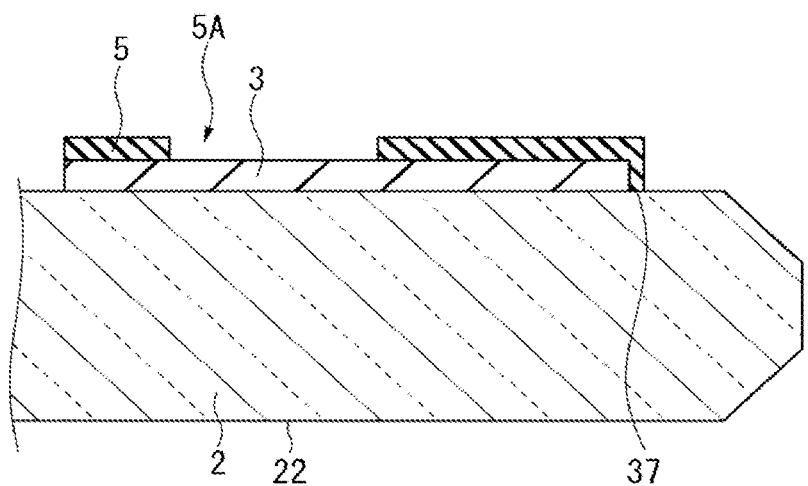

Subsequently, as shown in FIG. 4C, a light-shielding layer 5 is formed on the infrared ray-transmitting layer 3.

There are no particular limitations on the method for forming the light-shielding layer 5. However, from the standpoint of the continuity of manufacturing processes, it is preferable to form the light-shielding layer 5 by the same method as the infrared ray-transmitting layer 3 is formed.

During the printing of the light-shielding layer 5, the printing is performed in such a printing pattern that portions corresponding to the infrared ray-transmitting regions 39 are not printed, or the printing is performed after masking portions corresponding to the infrared ray-transmitting regions 39. A method other than the above described can be taken instead during the printing of the light-shielding layer 5. Furthermore, the widths of printing are adjusted so that a projection region 37 is formed.

A transparent substrate with light-shielding layer 1 is obtained by executing the above processes.

Workings and Advantages of Transparent Substrate with Light-Shielding Layer 1:

Since the end portions of the light-shielding layer 5 project from the end portions, closest to the outer circumference of the transparent substrate 2, of the infrared ray-transmitting layer 3, so as to be in contact with end faces of the infrared ray-transmitting layer 3 and the transparent substrate 2, the end portions, closest to the outer circumference of the transparent substrate 2, of the infrared ray-transmitting layer 3 are covered with the light-shielding layer 5.

Thus, even if a covered portion of the infrared ray-transmitting layer 3 receives stress that is caused by an expansion coefficient difference when the temperature or humidity has varied or receives external force of external impact, the light-shielding layer 5 absorbs stress or external force, whereby necessary peel strength of the infrared ray-transmitting layer 3 can be secured. Furthermore, since cleaning liquid is hard to permeate to the infrared ray-transmitting layer 3, the infrared ray-transmitting layer 3 is not likely to peel off due to its deterioration caused by the cleaning liquid.

It is preferable that the end portions, in contact with the transparent substrate 2, of the light-shielding layer 5 be closer to the outer circumference of the transparent substrate 2 by more than or equal to 0.01 mm than the end portions of the infrared ray-transmitting layer 3 are. In that case, the projected portions of the light-shielding layer 5 are long enough to prevent peeling of the infrared ray-transmitting layer 3.

It is preferable that the end portions, in contact with the transparent substrate 2, of the light-shielding layer 5 be closer to the outer circumference of the transparent substrate 2 by less than or equal to 0.5 mm than the end portions of the infrared ray-transmitting layer 3 are. In that case, a phenomenon can be prevented that a color difference between the projected portions of the light-shielding layer 5 and the infrared ray-transmitting layer 3 becomes conspicuous.

It is preferable that the transparent substrate 2 be made of chemically strengthened glass. In that case, a transparent substrate with light-shielding layer 1 can be provided that is high in strength and excoriation resistance and has good texture.

Modifications:

The present invention is not limited only to the above-described embodiment and various modifications, design changes, etc. are possible without departing from the gist of the invention. A specific procedure, structure, etc. that are employed in practicing the present invention may be changed to other ones as long as the latter do not constitute an obstacle to attainment of the object of the invention.

The transparent substrate 2 may have any of various shapes and be made of any of various materials according to a use.

Figure 5:
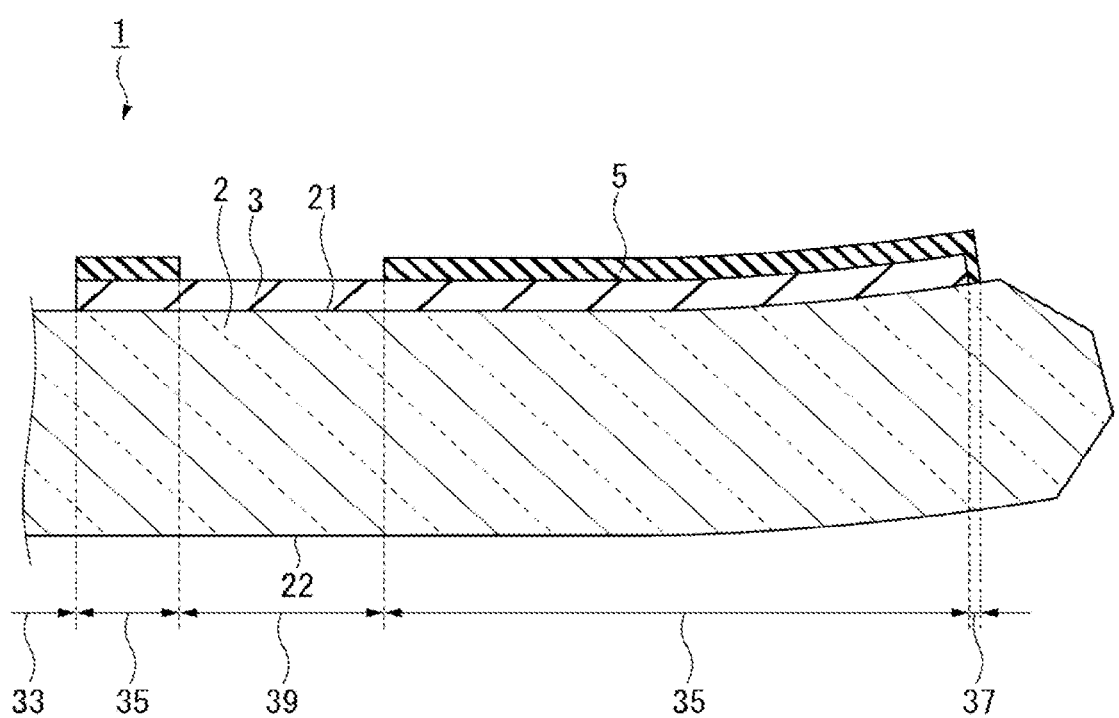
FIG. 5 is a sectional view of an end portion of a transparent substrate with a light-shielding layer according to a modification of the present embodiment.

As for the shape of the transparent substrate 2, the transparent substrate 2 is not limited to a sheet having only flat surfaces and may be, for example, a sheet at least part of which has curved surfaces or a sheet having a recess. For example, where the transparent substrate 2 is made of glass, as shown in FIG. 5 it may be a curved glass sheet. Where the transparent substrate 2 is a curved glass sheet, the attachment accuracy does not lower even if a counterpart member to which the transparent substrate with light-shielding layer 1 is to be attached has a bent shape. Furthermore, the transparent substrate 2 may be in film form, have a hole(s), or have a partial cut(s).

It suffices that the transparent substrate 2 be made of a transparent material. The transparent substrate 2 may be made of common glass such as inorganic glass or organic glass (e.g., polycarbonate or an acrylic resin) or made of any of other kinds of synthetic resins or the like.

Where inorganic glass is used as a material of the transparent substrate 2, it is preferable that its thickness be in a range of 0.5 mm to 5 mm. Glass whose thickness is larger than or equal to this lower limit value can provide a transparent substrate with light-shielding layer 1 that is high in strength and has good texture. Glass whose thickness is smaller than or equal to this upper limit value can reduce the weight of the transparent substrate 2 and makes it possible to secure necessary sensitivity of a touch panel in the case where the touch panel is disposed between the transparent substrate 2 and a display panel. Where inorganic glass is used as a material of the transparent substrate 2, it is even preferable that its thickness be in a range of 0.7 mm to 3 mm and further preferable that the thickness be in a range of 1.1 mm to 3 mm. When the transparent substrate with light-shielding layer 1 is used in a vehicle display device, glass whose thickness is larger than or equal to 1.1 mm allows the vehicle display device to have such impact resistance as to be able to pass a head impact test.

Specific examples of the glass sheet materials include chemically strengthened glass materials obtained by performing chemical strengthening treatment on soda-lime glass that is colorless and transparent, aluminosilicate glass ($SiO_2$—$Al_2O_3$—$Na_2O$ based glass), and lithium aluminosilicate glass.

As the glass sheet, for example, a glass sheet material having compositions, in terms of oxide-based mole percentages, of 50% to 80% of $SiO_2$, 1% to 20% of $Al_2O_3$, 6% to 20% of $Na_2O$, 0% to 11% of $K_2O$, 0% to 15% of MgO, 0% to 6% of CaO, and 0% to 5% of $ZrO_2$ can be used. As for a specific example, strengthened glass materials (e.g., "Dragontrail" (registered trademark) manufactured by AGC Inc.) obtained by performing strengthening treatment on aluminosilicate glass can be used suitably.

Where inorganic glass is used for the transparent substrate 2, it may be subjected to either of chemical strengthening treatment or physical strengthening treatment; however, it is preferable to perform chemical strengthening treatment. Employment of chemical strengthening treatment is proper as strengthening treatment for a relatively thin inorganic glass sheet as described above.

It is preferable that the surface of a glass sheet be formed with a compressive stress layer whose thickness is larger than or equal to 10 μm by chemical strengthening. It is even preferable that the thickness of the compressive stress layer be larger than or equal to 15 μm, further preferable that it be larger than or equal to 25 μm, and particularly preferable that it be larger than or equal to 30 μm. It is preferable that the surface compressive stress of the compressive stress layer be stronger than or equal to 500 MPa, even preferable that it be stronger than or equal to 650 MPa, and further preferable that it be stronger than or equal to 750 MPa.

Examples of a method for forming a compressive stress layer as described above in a glass sheet include a method of immersing the glass sheet in a molten salt of $NaNO_3$ or $KNO_3$, then performing ion exchange treatment (chemical strengthening treatment), and cooling the glass sheet to around room temperature. Treatment conditions such as the temperature of the molten salt of $NaNO_3$ or $KNO_3$ and the immersion time may be set so that the surface compressive stress and the thickness of a compressive stress layer have desired values.

Where organic glass, a synthetic resin, or the like is used as a material of the transparent substrate 2, the transparent substrate 2 may be a laminate of base members of the same kind or different kinds. Any of various kinds of adhesive layers may be inserted between the base members.

The ink to be used for forming the infrared ray-transmitting layer 3 is, for example, the photocurable resin or thermosetting resin containing a pigment capable of transmitting infrared ray. The pigment may be either an inorganic pigment or an organic pigment. Examples of the inorganic pigment include iron oxide, titanium oxide, and a composite oxides-based pigment. Examples of the organic pigment include metal complex-based pigments such as a phthalocyanine based pigment, an anthraquinone based pigment, and an azo based pigment.

It is preferable that the color of the infrared ray-transmitting layer 3 be the same as that of the light-shielding layer 5. Where the light-shielding layer 5 is black, it is preferable that the infrared ray-transmitting layer 3 be also black.

Where the infrared ray-transmitting layer 3 is black, a black pigment can be used. However, it is preferable to express black using pigments other than black ones. This is to impart, to the infrared ray-transmitting layer 3, an optical property that it transmits infrared ray while shielding visible light. Examples of black pigments include titanium black and carbon black.

Examples of non-black pigments that can be used for the infrared ray-transmitting layer 3 include a red pigment, a yellow pigment, a blue pigment, and a green pigment. Examples of the red pigment include a diketo pyrrolo pirrole-based pigment, an anthraquinone-based pigment, and a perylene-based pigment. Examples of the yellow pigment include an anthraquinone-based pigment and an isoindoline-based pigment. Examples of the blue pigment include a copper phthalocyanine-based pigment and an anthraquinone-based pigment. Examples of the green pigment include a phthalocyanine-based pigment and an isoindoline-based pigment.

It is preferable that the non-black pigments to be contained in the infrared ray-transmitting layer 3 include pigments of at least three different colors. This is to facilitate designing for imparting, to the infrared ray-transmitting layer 3, an optical property of transmitting infrared ray while shielding visible light.

Examples of the photocurable resin or thermosetting resin contained in the ink for forming the infrared ray-transmitting layer 3 include an acrylic resin, an epoxy resin, a polyimide resin, and a polyester resin. The ink for forming the infrared ray-transmitting layer 3 may contain a photopolymerization initiator, a photosensitizer, a dispersant, a surfactant, a stabilizer, a leveling agent, etc.

The content of infrared ray-transmitting materials in the infrared ray-transmitting layer 3 may be changed in a desired manner according to a desired optical property. It is preferable that the content of infrared ray-transmitting materials, that is, the ratio of the sum of their masses to the entire mass of the infrared ray-transmitting layer 3 be in a range of 0.01 mass % to 20 mass %. The content of infrared ray-transmitting materials can be set by adjusting the ratio of the sum of the masses of the infrared ray-transmitting materials to the entire mass of the ink.

The ink to be used for forming the light-shielding layer 5 may be either an inorganic ink or an organic ink. For example, a pigment contained in the inorganic ink may be a composition including: at least one selected from the group consisting of $SiO_2$, $ZnO$, $B_2O_3$, $Bi_2O_3$, $Li_2O$, $Na_2O$, and $K_2O$; at least one selected from the group consisting of $CuO$, $Al_2O_3$, $ZrO_2$, $SnO_2$, and $CeO_2$; $Fe_2O_3$; and $TiO_2$.

Any of various kinds of printing materials in which a resin and a pigment are dissolved in a solvent can be used as the organic ink. For example, the resin may be at least one resin selected from the group consisting of an acrylic resin, a urethane resin, an epoxy resin, a polyester resin, a polyamide resin, a vinyl acetate resin, a phenol resin, an olefin, ethylene-vinyl acetate copolymer resin, a polyvinyl acetal resin, natural rubber, a styrene-butadiene copolymer, an acrylonitrile-butadiene copolymer, polyester polyol, and polyether polyurethane polyol.

The solvent may be water, alcohol, ester, ketone, an aromatic hydrocarbon-based solvent, or an aliphatic hydrocarbon-based solvent. Examples of alcohols include isopropyl alcohol, methanol, and ethanol. Examples of ester include ethyl acetate. Examples of ketone include methyl ethyl ketone. Examples of aromatic hydrocarbon-based solvents include toluene, xylene, Solvesso (registered trademark) 100, and Solvesso (registered trademark) 150. Examples of aliphatic hydrocarbon-based solvent include hexane.

The above-mentioned materials are just examples, and various other printing materials can be used. Each of the above-mentioned organic printing materials is applied to the infrared ray-transmitting layer 3 and then the solvent is evaporated, whereby a resin light-shielding layer 5 is formed. The ink to be used for forming the light-shielding layer 5 may be either a thermosetting ink (i.e., an ink that can be set by heating) or a UV-curable resin; there are no particular limitations in this respect.

The ink to be used for forming the light-shielding layer 5 may contain a pigment. Where the light-shielding layer 5 should be black, a black pigment such as carbon black can be used. A pigment having a proper color can be used according to a desired color of the light-shielding layer 5.

The light-shielding layer 5 may be a laminate of a desired number of layers. For example, although the light-shielding layer 5 shown in FIG. 3 is of one layer, the light-shielding layer 5 may be a laminate of two or more layers. Where the light-shielding layer 5 is a laminate of two or more layers, different inks may be used for printing of the respective layers.

The sheet-like shape of the light-shielding layer 5 is not limited to a frame shape. For example, the light-shielding layer 5 may have a linear shape that is parallel with one side of the first main surface 21 of the transparent substrate 2, have an L shape that is parallel with two sides, connected to each other, of the first main surface 21, or be shaped like two straight bars that are parallel with two respective sides, opposed to each other, of the first main surface 21. Where the first main surface 21 of the transparent substrate 2 is shaped like a polygon other than a rectangle, a circle, or an atypical shape, the light-shielding layer 5 may have a frame shape corresponding to the shape of the first main surface 21, a linear shape that is parallel with one side of a polygon, or an arc shape that is parallel with part of a circle.

Figure 6:
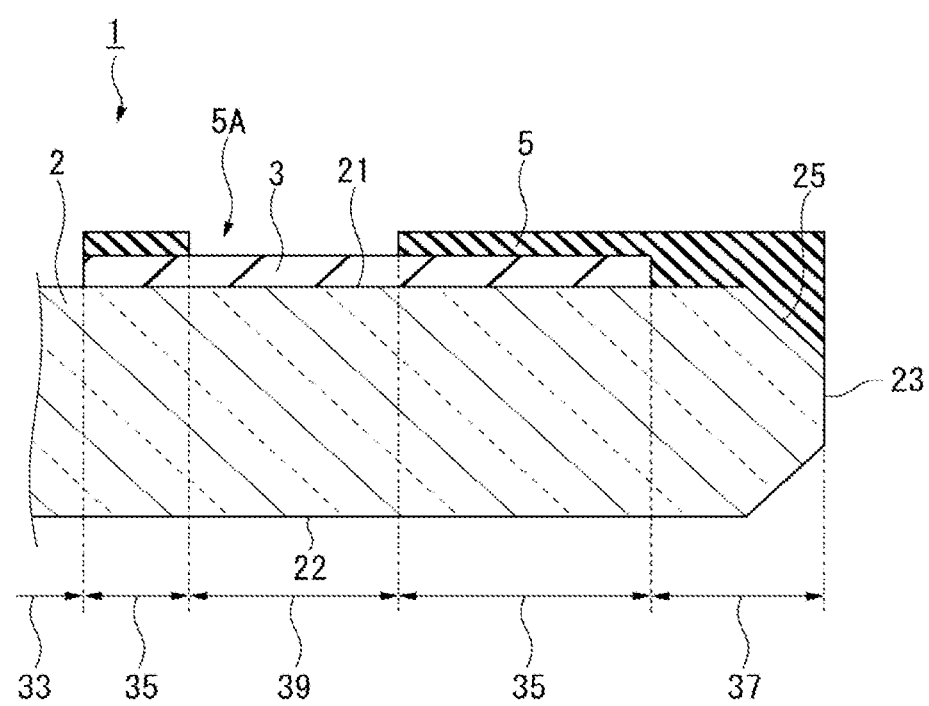
FIG. 6 is a sectional view of an end portion of a transparent substrate with a light-shielding layer according to a modification of the present embodiment.

As shown in FIG. 6, end portions, closest to the outer circumference of the transparent substrate 2, of the light-shielding layer 5 may be in contact with respective chamfered portions 25 of the transparent substrate 2. Since the chamfered portions 25 are covered with the light-shielding layer 5, the chamfered portions 25 are increased in excoriation resistance.

Where the surface roughness of the chamfered portions 25 of the transparent substrate 2 is higher than that of its first main surface 21, the light-shielding layer 5 bites into the rough surfaces of the transparent substrate 2, whereby the adhesion between the light-shielding layer 5 and the transparent substrate 2, that is, their adhesion strength, is increased.

Figure 7:
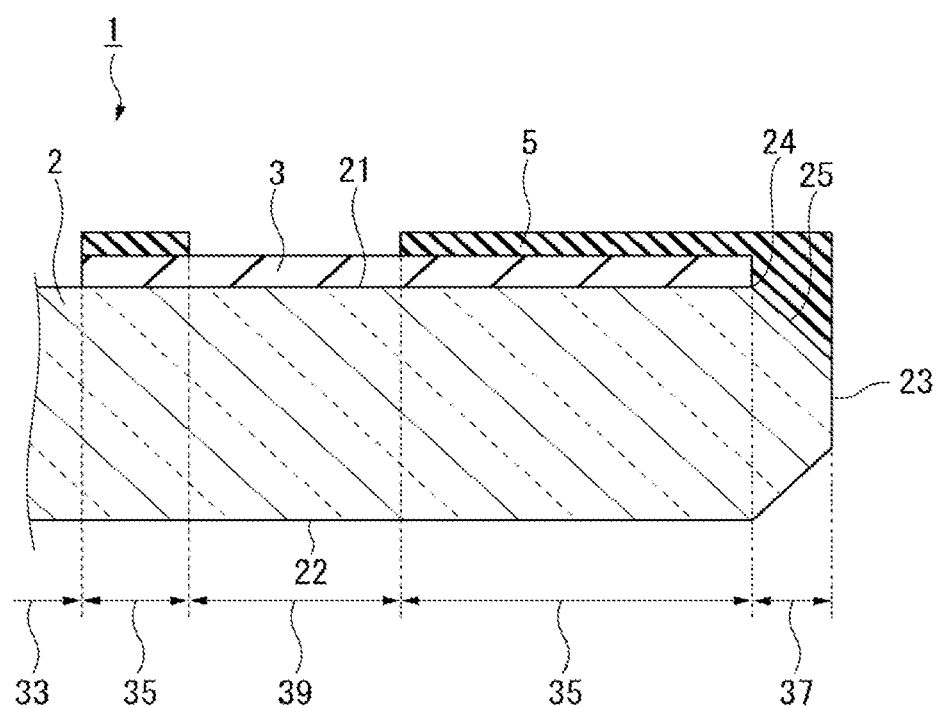
FIG. 7 is a sectional view of an end portion of a transparent substrate with a light-shielding layer according to a modification of the present embodiment.

As shown in FIG. 7, in the case where the light-shielding layer 5 is in contact with respective chamfered portions 25 of the transparent substrate 2, the infrared ray-transmitting layer 3 may reach the circumferential edges 24 of the first main surface 21.

In this structure, since the infrared ray-transmitting layer 3 covers the entire portion, other than the portion in the display region 33, of the first main surface 21, the transparent substrate 2 is increased in excoriation resistance and the infrared ray-transmitting layer 3 is increased in peel strength. Furthermore, when the transparent substrate with light-shielding layer 1 is viewed from the side of the second main surface 22 by a user, its portions in the light-shielding region 35 and the projection region 37 look uniform, which means a good appearance.

Figure 8:
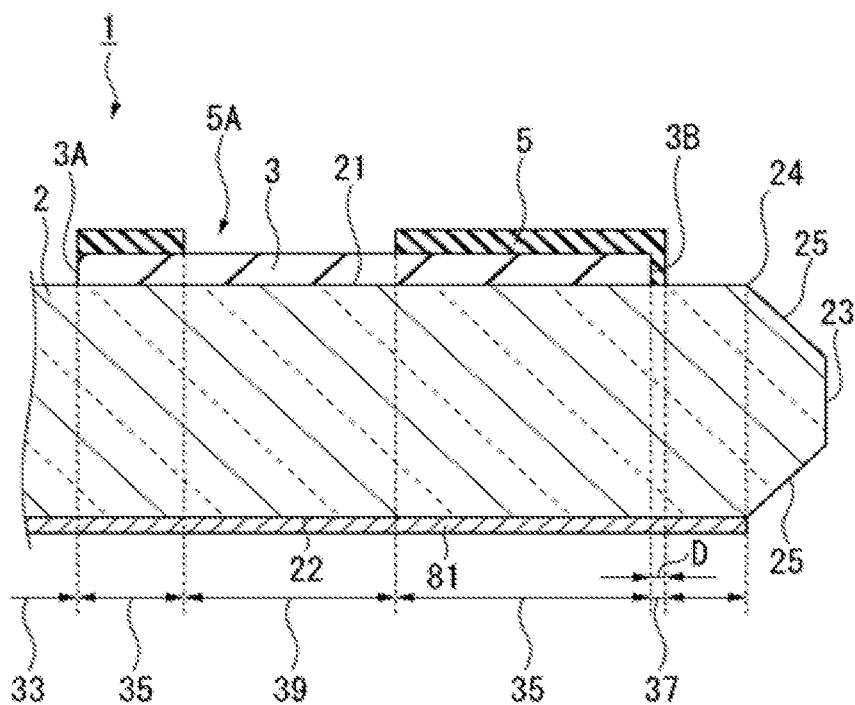
FIG. 8 is a sectional view of an end portion of a transparent substrate with a light-shielding layer according to a modification of the present embodiment.

As shown in FIG. 8, a functional layer 81 having an antiglare layer, an antireflection layer, an antifouling layer, an antibacterial layer, a UV-cutting layer, or the like may be formed on at least one of the first main surface 21 and the second main surface 22 of the transparent substrate 2. A case that the functional layer 81 has an antiglare layer, an antireflection layer, or an antifouling layer will be described below.

Antiglare Layer

Where an antiglare layer is formed as the functional layer 81, light that is incident on the transparent substrate with light-shielding layer 1 from the side of the second main surface 22 is scattered by the functional layer 81, whereby the degree of reflection of an undesired image carried by the incident light can be lowered. Examples of a method for imparting antiglareness to the transparent substrate 2 include a method of forming rough structures on the surface(s) of the transparent substrate 2. Although it suffices to form the antiglare layer on at least one of the first main surface 21 and the second main surface 22 of the transparent substrate 2, it is preferable that the antiglare layer be formed on the second main surface 22.

Rough structures can be formed by any of known methods. Where the transparent substrate 2 is a glass sheet, one method is to form rough structures having desired surface roughness by forming an etched layer by performing chemical or physical surface treatment on the surface of the glass sheet and another method is to stick a coated layer such as an antiglare film on the surface of the glass sheet.

The antiglare layer being an etched layer is advantageous in that it is not necessary to coat the glass sheet with an antiglare material separately. The antiglare layer being a coated layer is advantageous in that the antiglareness can be controlled easily through selection of a material.

Examples of the chemical antiglare treatment include frosting. For example, frosting can be performed by immersing a target glass sheet in a mixed solution of hydrogen fluoride and ammonium fluoride.

Examples of the physical antiglare treatment include sand blasting in which a main surface of a glass sheet is blasted with crystalline silicon dioxide powder, silicon carbide powder, or the like using compressed air and a method of rubbing a main surface of a glass sheet with a brush on which crystalline silicon dioxide powder, silicon carbide powder, or the like is attached and that is moistened with water.

It is preferable that the surface roughness (root mean square (RMS) roughness) of the surface, bearing the antiglare layer, of the transparent substrate 2 be in a range of 0.01 μm to 0.5 μm, because in this range light that is incident from the side of the second main surface 22 can be scattered more reliably. It is even preferable that the surface roughness (RMS roughness) be in a range of 0.01 μm to 0.3 μm, and further preferable that it be in a range of 0.02 μm to 0.2 μm. When the surface roughness (RMS roughness) is in the above range, the haze value of the transparent substrate having the antiglare layer can be adjusted so as to be in a range of 1% to 30%. The haze value is a value prescribed by JIS K 7136 (2000).

Antireflection Layer

Where an antireflection layer is formed as the functional layer 81 on at least one of the first main surface 21 and the second main surface 22 of the transparent substrate 2, reflection of incident light can be prevented and hence reflection of an undesired image carried by the incident light can be prevented. It is preferable that the antireflection layer be formed on the second main surface 22 because this is particularly effective when external light, for example, is incident on the second main surface 22 which is located on the user side in a final product.

Where the functional layer 81 is an antireflection layer, it is preferable to employ a laminate structure of a high refractive index layer whose refractive index at a wavelength of 550 nm is larger than or equal to 1.9 and a low refractive index layer whose refractive index at the wavelength of 550 nm is smaller than or equal to 1.6. An antireflection layer having the laminate structure of the high refractive index layer and the low refractive index layer makes it possible to prevent reflection of visible light more reliably.

The number of high refractive index layers and the number of low refractive index layers formed in the antireflection layer may be one typically; however, two or more high refractive index layers and two or more low refractive index layers may be formed in the antireflection layer. Where the antireflection layer includes one high refractive index layer and one low refractive index layer, it is preferable that the high refractive index layer and the low refractive index layer be formed in this order on at least one of the first main surface 21 and the second main surface 22 of the transparent substrate 2. Where the antireflection layer includes two or more high refractive index layers and two or more low refractive index layers, it is preferable to form a laminate in which the high refractive index layers and the low refractive index layers are formed alternately with a high refractive index layer laid first.

It is preferable that the total number of layers of the laminate be in a range of two to eight, even preferable that it be in a range of two to six, and further preferable that it be in a range of two to four. Another kind of layer may be added within the confines that the optical properties are not impaired. For example, an $SiO_2$ film may be inserted between the glass sheet and the first layer to prevent diffusion of Na from the glass sheet.

There are no particular limitations on the materials of the high refractive index layer(s) and the low refractive index layer(s); proper materials are selected taking into consideration a required degree of antireflection performance and necessary productivity. Examples of materials of the high refractive index layer(s) include niobium oxide ($Nb_2O_5$), titanium oxide ($TiO_2$), zirconium oxide ($ZrO_2$), tantalum oxide ($Ta_2O_5$), aluminum oxide ($Al_2O_3$), and silicon nitride (SiN). One or more materials selected from these materials can be used preferably. Examples of materials of the low refractive index layer(s) include silicon oxide (in particular, silicon dioxide ($SiO_2$)), a material containing a mixed oxide of Si and Sn, a material containing a mixed oxide of Si and Zr, and a material containing a mixed oxide of Si and Al. One or more materials selected from these materials can be used preferably.

The antireflection layer can be formed properly by a method of forming an inorganic thin film directly on the surface; a method of performing surface treatment by, for example, etching; or a dry method such as chemical vapor deposition (CVD) or physical vapor deposition (PVD), in particular, vacuum evaporation or sputtering which is a kind of physical vapor deposition.

It is preferable that the thickness of the antireflection layer be in a range of 100 nm to 500 nm. Setting the thickness of the antireflection layer larger than or equal to the lower limit value of this range is preferable because reflection of external light can be suppressed effectively. On the other hand, by setting the thickness of the antireflection layer smaller than or equal to 500 nm, its surface roughness can be decreased and hence its abrasion resistance can be increased. Setting the thickness of the antireflection layer smaller than or equal to the upper limit value is preferable from the viewpoint of productivity.

It is preferable that a* and b* of the CIE (Commission Internationale de l'Éclairage) color difference formulas of the antireflection layer be in range of −6 to 1 and −8 to 1, respectively.

Where a* and b* of the antireflection layer are in range of −6 to 1 and −8 to 1, respectively, there is no probability that the antireflection layer has a danger color (warning color) and hence its color can be prevented from becoming conspicuous.

Antifouling Layer

Where an antifouling layer is formed as the functional layer 81, the degree of sticking of a stain such as a fingerprint, sebum, or sweat on the second main surface 22 can be lowered even if a human finger touches it.

Examples of methods for forming an antifouling layer include vacuum evaporation (dry method) of evaporating, for example, an organic compound containing fluorine in a vacuum chamber and causing it to stick to the surface of an antireflection layer and a method (wet method) of dissolving, for example, an organic compound containing fluorine in an organic solvent, adjusting its concentration to a prescribed value, and applying a resulting solution to the surface of an antireflection layer.

As for the dry method, selection can be made as appropriate from ion-beam-assisted evaporation, ion plating, sputtering, plasma CVD etc. As for the wet method, selection can be made as appropriate from spin coating, dip coating, casting, slit coating, spray coating, etc. Either of the dry method and the wet method can be used. Use of a dry film forming method is preferable from the viewpoint of excoriation resistance.

The material of the antifouling layer can be selected as appropriate from organic compounds containing fluorine and other compounds capable of providing an antifouling property, water repellency, and oil repellency. Specific examples thereof include an organic silicon compound containing fluorine and a hydrolyzable silicon compound containing fluorine. Any kind of organic compound containing fluorine can be employed with no particular limitations as long as it can provide an antifouling property, water repellency, and oil repellency.

Where an antireflection layer is formed on the second main surface 22 of the transparent substrate 2 or an antiglare layer treatment surface, it is preferable that a coating of an organic silicon compound containing fluorine be formed on the surface of the antireflection layer to form an antifouling layer. Where the transparent substrate 2 is a glass sheet that has been subjected to surface treatment such as antiglare treatment or chemical strengthening treatment but on which no antireflection layer is formed, it is preferable that a coating of an organic silicon compound containing fluorine be formed directly on the surface that has been subjected to the surface treatment.

Examples of methods for forming a coating of an organic silicon compound containing fluorine include a method of applying a composition of a silane coupling agent having a fluoroalkyl group such as a perfluoroalkyl group or a fluoroalkyl group including a perfluoro (polyoxyalkylene) chain by spin coating, dip coating, casting, slit coating, spray coating, or the like, and then performing a heating treatment; and a vacuum deposition method of vapor-depositing an organic silicon compound containing fluorine and then performing a heating treatment. Where a coating of an organic silicon compound containing fluorine is formed by the vacuum deposition method, it is preferable to use a coating forming composition containing a hydrolyzable silicon compound containing fluorine.

As for the antifouling layer, there are no particular limitations on the hydrolyzable silicon compound containing fluorine that is used for formation of a coating of an organic silicon compound containing fluorine as long as the resulting coating of an organic silicon compound containing fluorine has an antifouling property such as water repellency and oil repellency. A specific example of the hydrolyzable silicon compound containing fluorine includes one having at least one group selected from the group consisting of a perfluoropolyether group, a perfluoroalkylene group, and a perfluoroalkyl group.

There are no particular limitations on the thickness of the antifouling layer. However, it is preferable that the thickness of the antifouling layer be in a range of 2 nm to 20 nm, even preferable that it be in a range of 2 nm to 15 nm, and further preferable that it be in a range of 3 nm to 10 nm. Where the thickness is larger than or equal to 2 nm, the surface of an antireflection layer is covered uniformly with the antifouling layer to possibly withstand in practical use in terms of excoriation resistance. Where the thickness is smaller than or equal to 20 nm, good optical properties (e.g., luminous reflectance and a haze value) are obtained in a state that the antifouling layer is laid.

The structure of the functional layer 81 is not limited to a case that only one of an antiglare layer, an antireflection layer, an antifouling layer, an antibacterial layer, and a UV-cutting layer is formed; two or more of them may be laid on each other. A protective layer may further be formed on the functional layer 81.

To increase the adhesion of the infrared ray-transmitting layer 3 and a light-shielding layer 5, primer treatment, etching treatment, or the like may be performed on the first main surface 21 and chamfered portions 25.

The transparent substrate with light-shielding layer 1 according to the present invention can be used, for example, as a cover member for a display device such as a cover glass of a panel display such as a liquid crystal display or an organic EL display, a vehicle information device, or a portable device. Where the transparent substrate with light-shielding layer 1 according to present the invention is used as a cover member for a display device, the device covered can be protected while necessary visibility is secured. Capable of decreasing the color difference between the infrared ray-transmitting layer 3 and the light-shielding layer 5, the transparent substrate with light-shielding layer 1 according to the present invention is particularly useful when applied to devices and members in which importance is attached to appearance such as a vehicle information device for a luxury car and a vehicle interior member used in a vehicle information device.

Furthermore, being high in the peel strength against stress that is caused by an expansion coefficient difference between the transparent substrate 2 and the infrared ray-transmitting layer 3 when the temperature or humidity has varied, the transparent substrate with light-shielding layer 1 according to the present invention is particularly suitable for vehicle interior members to be installed in automobiles in which a high-temperature, high-humidity environment tends to occur in summer.

Where the transparent substrate with light-shielding layer 1 according to the present invention is used for a display device, it is preferable that the infrared ray-transmitting layer 3 and the light-shielding layer 5 have a color corresponding to a color of the display device in non-display state. For example, where the color in the non-display state is blackish, it is preferable that the infrared ray-transmitting layer 3 and the light-shielding layer 5 be also blackish.

The infrared ray-transmitting layer 3 and the light-shielding layer 5 may constitute a pattern of an article to which the transparent sheet with light-shielding layer 1 is applied, so as to improve the design property of the article.

Now, an example display device incorporating the transparent substrate with light-shielding layer 1 will be described.

Figure 9:
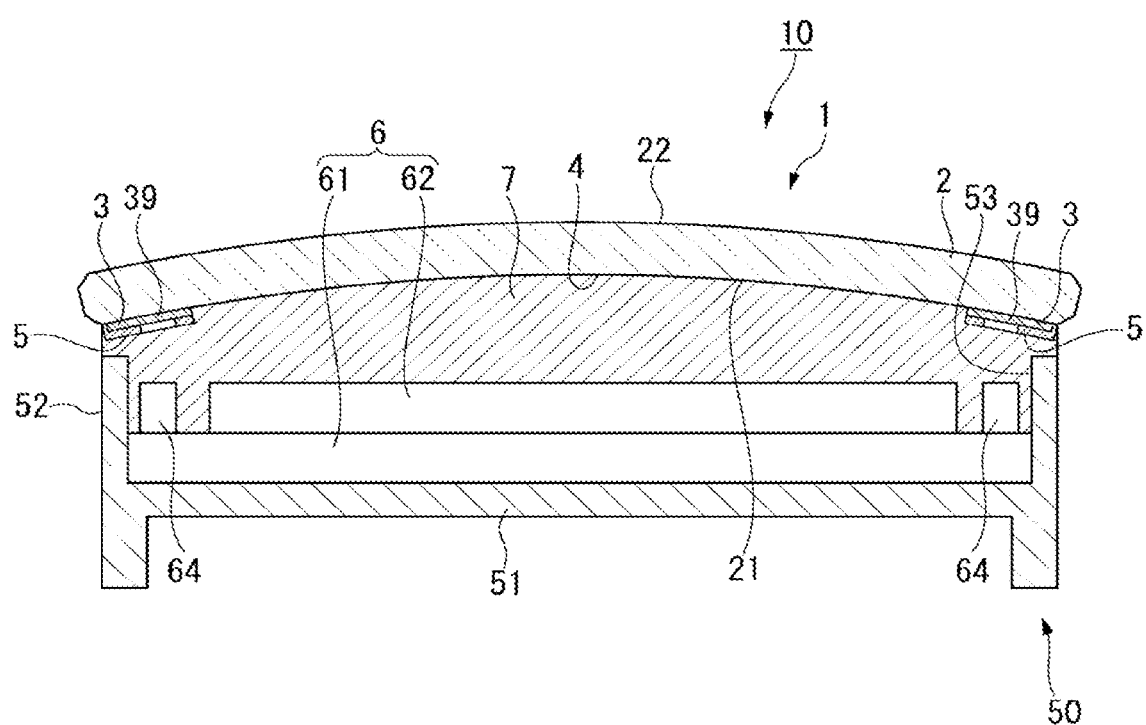
FIG. 9 is a sectional view of a display device that is equipped with a transparent substrate with a light-shielding layer according to the present embodiment.

A display device 10 shown in FIG. 9 includes a frame 50. The frame 50 has a bottom portion 51, side walls 52 which intersect the bottom portion 51, and an opening portion 53 which is opposed to the bottom portion 51. A liquid crystal module 6 is disposed in the space that is surrounded by the bottom portion 51 and the side walls 52. The liquid crystal module 6 includes a backlight 61 disposed on the side of the bottom portion 51, a liquid crystal panel 62 (display panel) mounted on the backlight 61, and infrared ray sensors 64 mounted on the backlight 61.

The transparent substrate with light-shielding layer 1 is disposed on top of the frame 50 in such a manner that the first main surface 21 is located on the side of the liquid crystal module 6. A portion of the light-shielding layer 5 of the transparent substrate with light-shielding layer 1 is bonded to the frame 50, and the other portion of the light-shielding layer 5 and a display portion 4 of the first main surface 21 are bonded to the liquid crystal module 6 via an adhesive layer 7 provided in the opening portion 53 and on the top surfaces of the side walls 52.

The liquid crystal panel 62 is disposed so as to be opposed to the display portion 4. The infrared ray sensors 64 are disposed so as to be opposed to the respective infrared ray-transmitting regions 39.

It is preferable that the adhesive layer 7 be transparent and the refractive index difference between the adhesive layer 7 and the transparent substrate 2 be small.

An example of the adhesive layer 7 includes a layer that is made of a transparent resin obtained by setting a liquid, curable resin composition. Examples of the curable resin composition include a photocurable resin composition and a thermosetting resin composition, among them, a photocurable resin composition containing a curable compound and a photopolymerization initiator is preferable. A coating of a curable resin composition is formed by applying a curable resin composition using a die coater, a roll coater, or the like.

The adhesive layer 7 may be an OCA film (Optical Clear Adhesive film, OCA tape). In this case, the OCA film is bonded to the first main surface 21 side of the transparent substrate with light-shielding layer 1.

It is preferable that the thickness of the adhesive layer 7 be in a range of 5 μm to 400 μm, and even preferable that it be in a range of 50 μm to 200 μm. It is preferable that the storage shear modulus of the adhesive layer 7 be in a range of 5 kPa to 5 MPa, and even preferable that it be in a range of 1 MPa to 5 MPa.

There are no particular limitations on the assembling order of manufacture of the display device 10. For example, the display device 10 may be assembled by preparing a structural body in which the adhesive layer 7 is formed on the transparent substrate with light-shielding layer 1 in advance, then mounting it on the frame 50, and finally bonding the liquid crystal module 6 to it.

The display device 10 may include a touch sensor. To incorporate the touch sensor into the display device 10, the touch sensor is disposed on the side of the first main surface 21 of the transparent substrate with light-shielding layer 1 via another adhesive layer (not shown) and then the liquid crystal module 6 is attached to it via the adhesive layer 7.

Although in FIG. 9 the liquid crystal panel 62 and the infrared ray sensors 64 are bonded together to the transparent substrate with light-shielding layer 1 with the adhesive layer 7, the present invention is not limited to this case. Adhesive layers 7 may be selected as appropriate in view of the optical properties of the liquid crystal panel 62 and the infrared ray sensors 64. The distances (bonding thicknesses) between the transparent substrate with light-shielding layer 1 and the liquid crystal panel 62 and the infrared ray sensors 64 need not always be the same.

The present application is based on Japanese Patent Application (No. 2018-083096) filed on Apr. 24, 2018 and the entirety of which is incorporated by reference.

REFERENCE SIGNS LIST

1 . . . Transparent substrate with light-shielding layer;
2 . . . Transparent substrate;
3 . . . Infrared ray-transmitting layer;
5 . . . Light-shielding layer;
10 . . . Display device;
21 . . . First main surface;
22 . . . Second main surface;
23 . . . End face;
25 . . . Chamfered portion;
35 . . . Light-shielding region;
37 . . . Projection region;
39 . . . Infrared ray-transmitting region;
81 . . . Functional layer.

What is claimed is:

1. A transparent substrate with a light-shielding layer, comprising:
   a transparent substrate comprising a first main surface and a second main surface;
   an infrared ray-transmitting layer that is disposed so as to be in contact with the first main surface of the transparent substrate, transmits an infrared ray, and shields a visible light; and a light-shielding layer that is disposed on the infrared ray-transmitting layer, comprises an opening that exposes a part of the infrared ray-transmitting layer, and shields the visible light and the infrared ray, wherein the light-shielding layer comprises an end portion that projects from an end portion of the infrared ray-transmitting layer, that is closest to an outer circumference of the transparent substrate, and is in contact with an end face of the infrared ray-transmitting layer and the transparent substrate, and wherein the light-shielding layer and the infrared ray-transmitting layer each are shaped in a frame as a plane shape, and an outer circumferential end portion of the frame of the light-shielding layer is in contact with the transparent substrate.

2. The transparent substrate with a light-shielding layer according to claim 1, wherein the end portion of the light-shielding layer, that is in contact with the transparent substrate, is closer to the outer circumference of the transparent substrate by more than or equal to 0.01 mm than the end portion of the infrared ray-transmitting layer is.

3. The transparent substrate with a light-shielding layer according to claim 1, wherein the end portion of the light-shielding layer, that is in contact with the transparent substrate, is closer to the outer circumference of the transparent substrate by less than or equal to 0.5 mm than the end portion of the infrared ray-transmitting layer is.

4. The transparent substrate with a light-shielding layer according to claim 1, wherein the transparent substrate has a thickness of 0.5 mm to 5 mm.

5. The transparent substrate with a light-shielding layer according to claim 1, wherein the transparent substrate comprises an end face comprising a chamfered portion, and the light-shielding layer is in contact with the chamfered portion.

6. The transparent substrate with a light-shielding layer according to claim 1, having a visible light transmittance as measured according to JIS R 3106: 1998 of smaller than or equal to 0.1% in a light-shielding region, and having a visible light transmittance as measured according to JIS R 3106: 1998 of smaller than or equal to 5% and an infrared ray transmittance in a wavelength range of 900 nm to 1,000 nm of higher than or equal to 70% in an infrared ray-transmitting region, wherein, the light-shielding region is a region where the transparent substrate, the infrared ray-transmitting layer, and the light-shielding layer overlap with one another in a top view of the transparent substrate with a light-shielding layer, and the infrared ray-transmitting region is a region where the transparent substrate and the infrared ray-transmitting layer overlap with each other in the top view of the transparent substrate with a light-shielding layer.

7. The transparent substrate with a light-shielding layer according to claim 1, wherein the transparent substrate comprises a bent portion.

8. The transparent substrate with a light-shielding layer according to claim 1, wherein the transparent substrate comprises a functional layer on the second main surface, and the functional layer is at least one layer selected from the group consisting of an antireflection layer, an antiglare layer and an antifouling layer.

9. The transparent substrate with a light-shielding layer according to claim 1, wherein the transparent substrate is a chemically strengthened glass.

10. A vehicle interior member comprising the transparent substrate with a light-shielding layer according to claim 1.

11. A display device comprising the transparent substrate with a light-shielding layer according to claim 1.

* * * * *